US009519178B2

United States Patent
Moriwaki

(10) Patent No.: US 9,519,178 B2
(45) Date of Patent: Dec. 13, 2016

(54) COLOR FILTER SUBSTRATE, ELECTRO-OPTIC DEVICE, AND ELECTRONIC APPARATUS

(75) Inventor: Minoru Moriwaki, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 301 days.

(21) Appl. No.: 13/446,076

(22) Filed: Apr. 13, 2012

(65) Prior Publication Data

US 2012/0262654 A1 Oct. 18, 2012

(30) Foreign Application Priority Data

Apr. 18, 2011 (JP) ................. 2011-091800

(51) Int. Cl.
*G02F 1/1335* (2006.01)
*G02B 5/20* (2006.01)

(52) U.S. Cl.
CPC ......... *G02F 1/133512* (2013.01); *G02B 5/201* (2013.01); *G02F 1/133553* (2013.01); *G02F 2203/02* (2013.01)

(58) Field of Classification Search
CPC ............... G02B 5/201; G02F 1/133514; G02F 1/133553; G02F 2203/02
See application file for complete search history.

(56) References Cited

U.S. PATENT DOCUMENTS

| 6,850,297 | B2 * | 2/2005 | Takizawa et al. ............ 349/114 |
| 6,912,020 | B2 | 6/2005 | Kawata |
| 7,136,121 | B2 * | 11/2006 | Yeh et al. ..................... 349/106 |
| 7,764,340 | B2 | 7/2010 | Inaba et al. |
| 2010/0053512 | A1 | 3/2010 | Taniguchi et al. |

FOREIGN PATENT DOCUMENTS

| JP | 2002-122857 A | 4/2002 |
| JP | 2003-270431 A | 9/2003 |
| JP | 2004-78204 A | 3/2004 |
| JP | 2006-64858 A | 3/2006 |
| JP | 2006-072176 A | 3/2006 |
| JP | 2006-243171 A | 9/2006 |
| JP | 2008-70437 A | 3/2008 |
| JP | 2009-128742 A | 6/2009 |
| JP | 2010-60619 A | 3/2010 |
| JP | 2010-175599 A | 8/2010 |

\* cited by examiner

*Primary Examiner* — Paisley L Arendt
(74) *Attorney, Agent, or Firm* — ALG Intellectual Property, LLC

(57) ABSTRACT

A color filter substrate includes a color filter layer, a light-transmissive layer and a light-shielding layer. The light-transmissive layer is disposed between pixels and includes a side surface that forms a reflection surface. The light-shielding layer is laminated on the light-transmissive layer.

5 Claims, 8 Drawing Sheets

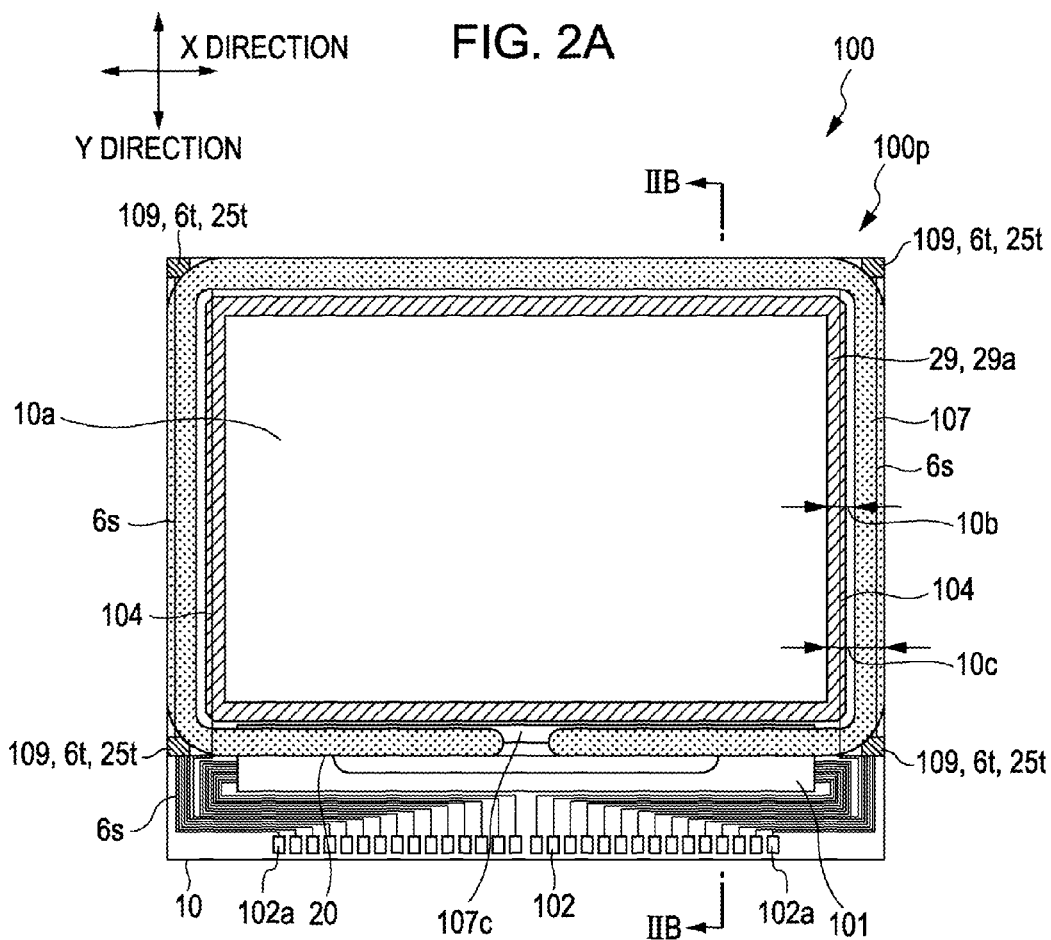
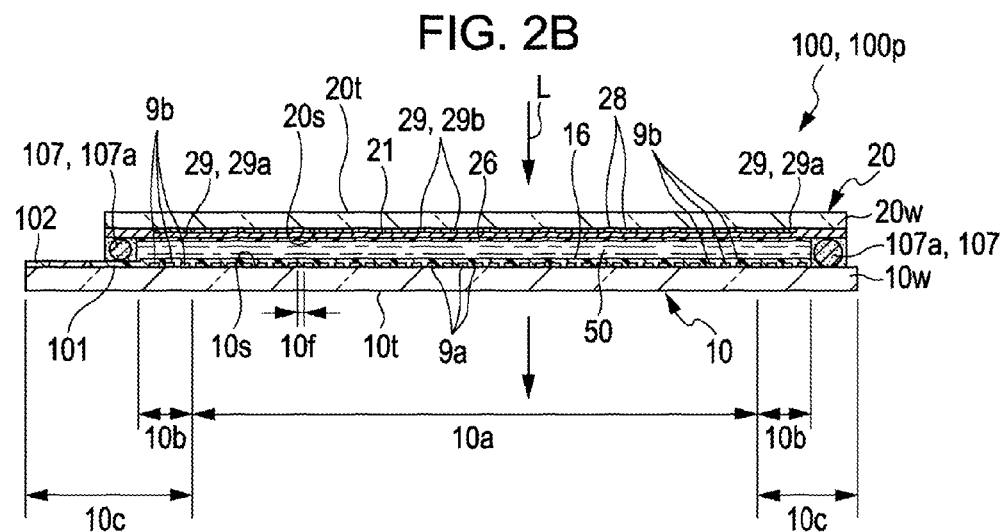

COLOR FILTER SUBSTRATE, ELECTRO-OPTIC DEVICE, AND ELECTRONIC APPARATUS

BACKGROUND

1. Technical Field

The present invention relates to a color filter substrate, an electro-optic device including the color filter substrate, and an electronic apparatus including the electro-optic device.

2. Related Art

When a color image is displayed in an electro-optic device such as a liquid crystal device, a color filter substrate in which a color filter layer is formed on one surface of a light-transmissive substrate is used as a counter substrate. Further, a color filter substrate is also used in an electro-optic device such as an organic electroluminescence device. In the color filter substrate, as shown in FIG. 8A, light-shielding protrusion portions 29t called a so-called black matrix or black stripe are formed between pixels and color filter layers 28 are formed in the regions partitioned by the light-shielding protrusion portions 29t in order to prevent color mixing between the adjacent pixels (sub-pixels).

To increase the chromaticity of the color filter layers 28 in the color filter substrate, the color filter layers 28 have to be formed thickly. In this case, the light-shielding protrusion portions 29t have to be formed so as to be thick. However, when the light-shielding protrusion portions 29t are formed by forming metal films in accordance with a sputter method, it takes a lot of time to form the films. Accordingly, a technique of forming the light-shielding protrusion portions 29t using a black photosensitive resin layer has been suggested (see JP-A-2003-270431).

However, exposure accuracy is low in the case of the black photosensitive resin. Therefore, when pixels are miniaturized for high accuracy of display, it is difficult to form the light-shielding protrusion portions 29t in the black photosensitive resin layer so as to correspond to the miniaturization of the pixels.

Here, as shown in FIG. 8B, the inventors have examined a technique of forming the light-shielding protrusion portions 29s by light-transmissive layers 291s formed by a CVD method or a coating method and metal-based light-shielding layers 292s formed of a metal, a metal compound, or the like laminated on the light-transmissive layers 291s and providing the color filter layers 28 inside the regions partitioned by the light-shielding protrusion portions 29s. With such a configuration, since the light-transmissive layers 291s can be formed by a CVD method or a coating method, the thick light-shielding protrusion portions 29s can be efficiently formed. Further, a metal oxide layer can be formed with high accuracy by a photolithography technique unlike the black photosensitive resin layer. Therefore, since a light-transmissive photosensitive resin layer can be exposed with high accuracy unlike the black photosensitive resin layer, the light-transmissive photosensitive resin layer can be formed so as to correspond to the miniaturization of the pixels. The configuration shown in FIG. 8B is a reference example disclosed to compare with the configuration of the invention and is not a configuration of a related art.

In the configuration shown in FIG. 8B, however, a problem may arise in that since the light-transmissive layer 291s is present on the lower layer of the light-shielding protrusion portion 29s, diagonally travelling light passes through the adjacent color filter layer 28, as indicated by an arrow L0, and thus a mixed color occurs.

SUMMARY

An advantage of some aspects of the invention is that it provides a color filter substrate capable of preventing a mixed color from occurring even when a thick color filter layer is provided, an electro-optic device including the color filter substrate, and an electronic apparatus including the electro-optic device.

According to an aspect of the invention, there is provided a color filter substrate including a protrusion portion partitioning a plurality of pixels for each color and a color filter layer formed in a region partitioned by the protrusion portion on one surface of a light-transmissive substrate. The protrusion portion includes a light-transmissive layer with a side surface forming a reflection surface and a light-shielding layer laminated on a side opposite to a light-transmissive substrate with respect to the light-transmissive layer.

In the color filter substrate according to the aspect of the invention, the protrusion portion partitioning the plurality of pixels for each color is formed on the one surface of the light-transmissive substrate and the color filter layer is formed in the region partitioned by the protrusion portion. Here, the protrusion portion has a lamination structure of the light-transmissive layer and the light-shielding layer. In the lamination structure, the protrusion portion can be minutely formed even when the protrusion portion is formed thickly to form the thick color filter layer, unlike a case where the entire protrusion portion is formed of a black photosensitive resin layer. Further, in the color filter substrate according to the aspect of the invention, the side surface of the light-transmissive layer forms the reflection surface. Therefore, light incident from an inclination direction does not travel toward a neighboring pixel. Accordingly, even when the protrusion portion has the lamination structure of the light-transmissive layer and the light-shielding layer, color mixing does not occur. Thus, even when the pixels are miniaturized, the thick color filter layer can be formed without causing color mixing.

In the color filter substrate according to the aspect of the invention, a refractive index of the light-transmissive layer may be different from that of the color filter layer. The side surface of the light-transmissive layer may form the reflection surface by a refractive index difference between the light-transmissive layer and the color filter layer. With such a configuration, the light-transmissive layer having the side surface that forms the reflection surface can be formed merely by optimizing the combination of the materials of the light-transmissive layer and the color filter layer.

In this case, the difference in the refractive index between the light-transmissive layer and the color filter layer may be 0.5 or more. With such a configuration, the side surface of the light-transmissive layer can form the reflection surface having a high reflection ratio.

In the color filter substrate according to the aspect of the invention, the side surface of the light-transmissive layer may form the reflection surface by laminating the light-shielding layer on the side surface.

In this case, the light-transmissive layer may include a first strip-shaped light-transmissive layer and a second strip-shaped light-transmissive layer parallel to the first strip-shaped light-transmissive layer. The reflection surface may be formed by laminating the light-shielding layer on a side surface oriented toward the second strip-shaped light-transmissive layer between both side surfaces of the first strip-shaped light-transmissive layer. The reflection surface may be formed by laminating the light-shielding layer on a side surface oriented toward the first strip-shaped light-transmissive layer between both side surfaces of the second strip-shaped light-transmissive layer.

The color filter substrate according to the aspect of the invention can be used in a liquid crystal device. In this case, the liquid crystal device may include a counter substrate including the color filter substrate according to the aspect of the invention; an element substrate in which a pixel transistor and a pixel electrode are formed; and a liquid crystal layer interposed between the counter substrate and the element substrate.

According to another aspect of the invention, an electro-optic device can be used as a display unit of an electronic apparatus such as a small-sized camera.

BRIEF DESCRIPTION OF THE DRAWINGS

The invention will be described with reference to the accompanying drawings, wherein like numbers reference like elements.

FIGS. 2A and 2B are diagrams illustrating a liquid crystal panel of the liquid crystal device according to the invention.

DESCRIPTION OF EXEMPLARY EMBODIMENTS

Figure 1:
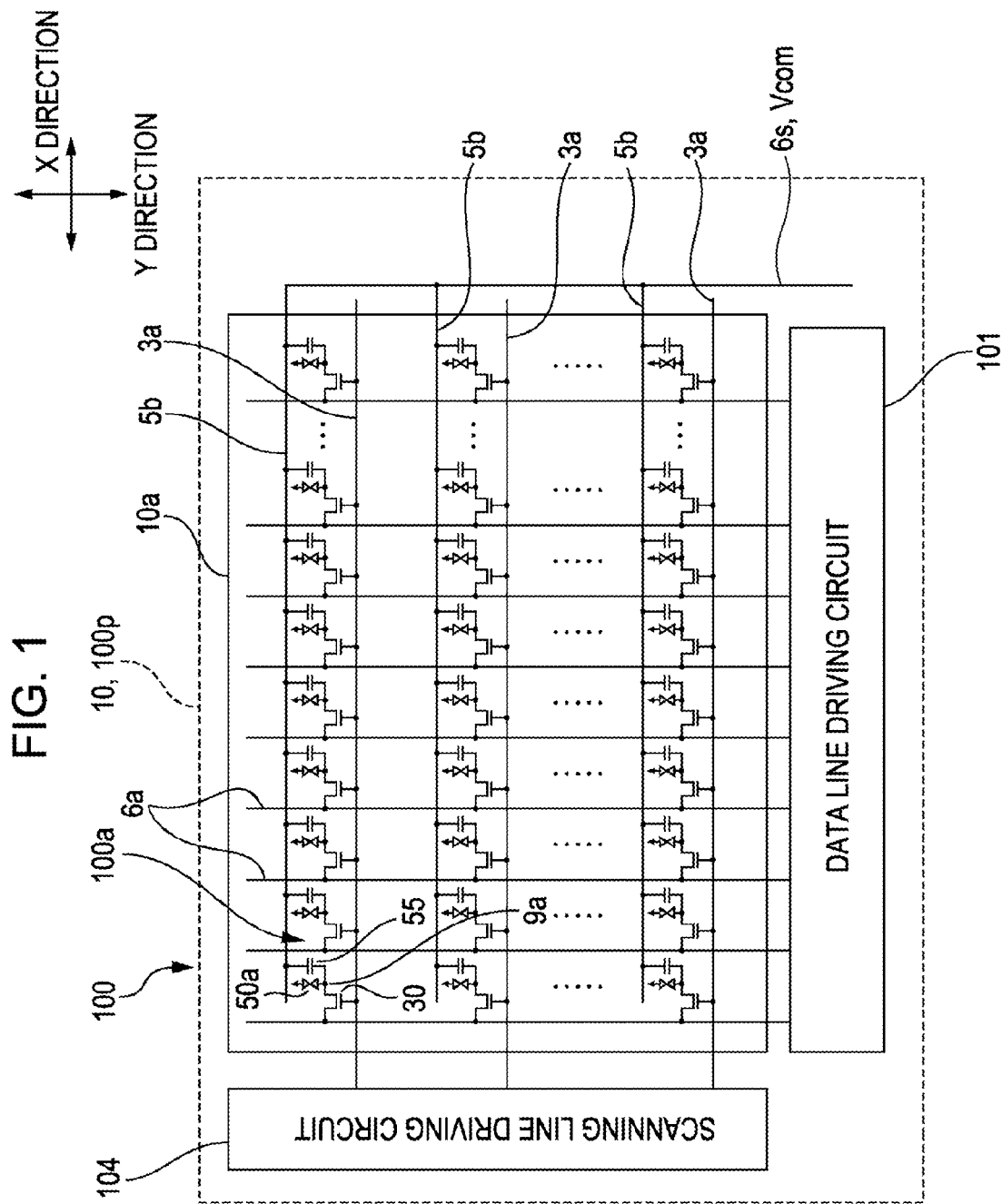
FIG. 1 is a block diagram illustrating the electric configuration of a liquid crystal device according to the invention.

Embodiments of the invention will be described with reference to the drawings. Hereinafter, a case will be mainly described in which a liquid crystal device is configured according to the invention among various electro-optic devices. Further, hereinafter, a case will be mainly described in which a counter substrate is configured as a color filter substrate according to the invention between an element substrate and a counter substrate used in the liquid crystal device. In the drawings used in the following description, the scales of respective layers or members are varied differently so that the respective layers or members can be recognized in the drawings. When the direction of current flowing in a field-effect type transistor is reversed, a source and a drain are changed. However, to facilitate the description, a side connected to a pixel electrode is assumed to be a drain and a side connected to a data line is assumed to be a source. When layers formed in the element substrate are described, an upper layer side or a surface side means a side (side on which the counter substrate is located) opposite to a side on which a substrate body of the element substrate is located and a lower layer side means a side on which the substrate body of the element substrate is located. Further, when layers formed in the counter substrate are described, an upper layer side or a surface side means a side (side on which the element substrate is located) opposite to a side on which a substrate body of the counter substrate is located and a lower layer side means a side on which the substrate body of the counter substrate is located.

First Embodiment

Overall Configuration

FIG. 1 is a block diagram illustrating the electric configuration of a liquid crystal device according to the invention. In FIG. 1, a liquid crystal device 100 includes a liquid crystal panel 100$p$ of a TN (Twisted Nematic) mode or a VA (Vertical Alignment) mode. The liquid crystal panel 100$p$ includes an image display region 10$a$ (pixel arrangement region/effective pixel region), where a plurality of pixels 100$a$ are arranged in a matrix form, in its middle region. In the liquid crystal panel 100$p$, a plurality of data lines 6$a$ (image signal lines) and a plurality of scanning lines 3$a$ extend horizontally and vertically inside the image display region 10$a$ and pixels 100$a$ are formed at positions corresponding to intersections between the data lines 6$a$ and the scanning lines 3$a$ in an element substrate 10 (see FIGS. 2A and 2B and the like) described below. A pixel transistor 30 configured by a field-effect type transistor and a pixel electrode 9$a$ described below are formed in each of the plurality of pixels 100$a$. The data line 6$a$ is electrically connected to a source of the pixel transistor 30, the scanning line 3$a$ is electrically connected to a gate of the pixel transistor 30, and the pixel electrode 9$a$ is electrically connected to a drain of the pixel transistor 30.

In the element substrate 10, a scanning line driving circuit 104 and a data line driving circuit 101 are installed outside the image display region 10$a$. The data line driving circuit 101 is electrically connected to the data lines 6$a$ and supplies an image signal supplied from an image processing circuit sequentially to the data lines 6$a$. The scanning line driving circuit 104 is electrically connected to the scanning lines 3$a$ and supplies a scanning signal sequentially to the scanning lines 3$a$.

In each pixel 100$a$, the pixel electrode 9$a$ faces a common electrode formed in the counter substrate 20 (see FIGS. 2A and 2B and the like) described below with a liquid crystal layer interposed therebetween and includes a liquid crystal capacitor 50$a$. Further, in each pixel 100$a$, a storage capacitor 55 is added in parallel to the liquid crystal capacitor 50$a$ to prevent a variation in an image signal retained by the liquid crystal capacitor 50$a$. In this embodiment, a capacitor line 5$b$ extending in parallel to the scanning line 3$a$ over the plurality of pixels 100$a$ is formed to form the storage capacitor 55. In this embodiment, the capacitor line 5$b$ is electrically connected to a constant potential wiring 6$s$ to which a common potential Vcom is applied.

Configurations of Liquid Crystal Panel 100$p$ and Element Substrate 10

FIGS. 2A and 2B are diagrams illustrating the liquid crystal panel 100$p$ of the liquid crystal device 100 according to the invention. FIGS. 2A and 2B are a plan view and a sectional view taken along the IIB-IIB, respectively, when the liquid crystal panel 100p is viewed from the counter substrate.

In the liquid crystal panel 100p, as shown in FIGS. 2A and 2B, the element substrate 10 and the counter substrate 20 are bonded to each other by a sealing member 107 with a predetermined gap therebetween. The sealing member 107 is formed in a frame shape along the outer edge of the counter substrate 20. The sealing member 107 is an adhesive formed of a photo-curable resin, a heat-curable resin, or the like and a gap material 107a such as fiberglass or glass bead is mixed to maintain the distance between the element substrate and counter substrate by a predetermined value.

In the liquid crystal panel 100p, both the element substrate 10 and the counter substrate 20 are rectangular. The image display region 10a described with reference to FIG. 1 is formed as a rectangular region in the substantial middle of the liquid crystal panel 100p. The sealing member 107 is also rectangular to correspond to the shape of the substrates, and the outer side of the image display region 10a is an outer circumferential region 10c with a square frame shape.

In the element substrate 10, the data line driving circuit 101 and a plurality of terminals 102 are formed along one side of the element substrate 10 in the outer circumferential region 10c and the scanning line driving circuit 104 is formed along another side adjacent to the one side. A flexible wiring substrate (not shown) is connected to the terminals 102, and various potentials or various signals are input to the element substrate 10 via the flexible wiring substrate.

As described in detail later, on one surface 10s of the element substrate 10 facing the counter substrate 20 between the one surface 10s and the other surface 10t of the element substrate 10, the pixel transistors 30 described with reference to FIG. 1 and the pixel electrodes 9a electrically connected to the pixel transistors 30 are formed in a matrix form in the image display region 10a, and the alignment film 16 is formed on an upper layer of the pixel electrodes 9a.

On the one surface 10s of the element substrate 10, dummy pixel electrodes 9b simultaneously formed with the pixel electrodes 9a are formed in a peripheral region 10b, which has a square frame shape and is interposed between the image display region 10a and the sealing member 107, in the outer circumferential region 10c outside the image display region 10a. The dummy pixel electrode 9b is connected to the adjacent dummy pixel electrode 9b by a connection portion (not shown) with a narrow width. When a common potential Vcom is applied to the dummy pixel electrodes 9b, the alignment of liquid crystal molecules in the outer circumferential end portion of the image display region 10a is prevented from being disturbed. The dummy pixel electrodes 9b contribute to flattening the surface, on which the alignment film 16 is formed, by compressing a difference between the height positions of the image display region 10a and the peripheral region 10b when the surface on which the alignment film 16 in the element substrate 10 is formed is flattened by polishing. Further, even when no potential is applied to the dummy pixel electrodes 9b and the dummy pixel electrodes 9b is in a potentially floating state, the dummy pixel electrodes 9b contribute to flattening the surface, on which the alignment film 16 is formed, by compressing the difference between the height positions of the image display region 10a and the peripheral region 10b.

The common electrode 21 is formed on one surface 20s of the counter substrate 20 facing the element substrate 10 between the one surface 20s and the other surface 20t of the counter substrate 20. The common electrode 21 is formed substantially in the entire surface of the counter substrate 20 or is formed as a plurality of strip-shaped electrodes across the plurality of pixels 100a. In this embodiment, the common electrode 21 is formed substantially in the entire surface of the counter substrate 20.

On the one surface 20s of the counter substrate 20, light-shielding protrusion portions 29 are formed in the lower layer of the common electrode 21 and an alignment film 26 is laminated on the surface of the common electrode 21. In this embodiment, the light-shielding protrusion portions 29 are formed as a frame section 29a extending along the outer circumference of the image display region 10a. In this embodiment, the light-shielding protrusion portion 29 is also formed as black matrix portion 29b overlapping an inter-pixel region 10f interposed between the adjacent pixel electrodes 9a. Here, the frame section 29a is formed at a position overlapping with the dummy pixel electrodes 9b, and the outer circumference of the frame section 29a is distant from the inner circumference of the sealing member 107. Therefore, the frame section 29a and the sealing member 107 do not overlap each other.

Outside the sealing member 107 of the liquid crystal panel 100p, inter-substrate conductive electrode portions 25t are formed at four corners of the one surface 20s of the counter substrate 20. On the one surface 10s of the element substrate 10, and inter-substrate conductive electrode portions 6t are formed at the positions facing the four corners (the inter-substrate conductive electrode portions 25t) of the counter substrate 20. The inter-substrate conductive electrode portions 6t are electrically connected to the constant potential wiring 6s to which the common potential Vcom is applied, and the constant potential wiring 6s is connected to common potential applying terminals 102a among the terminals 102. An inter-substrate conductive member 109 containing conductive particles is disposed between the inter-substrate conductive electrode portion 6t and the inter-substrate conductive electrode portion 25t, and thus the common electrode 21 of the counter substrate 20 is electrically connected to the element substrate 10 via the inter-substrate conductive electrode portion 6t, the inter-substrate conductive member 109, and the inter-substrate conductive electrode portion 25t. Therefore, the common electrode 21 is configured to apply the common potential Vcom from the side of the element substrate 10. The sealing member 107 has substantially the same width size and is installed along the outer circumference of the counter substrate 20. Therefore, the sealing member 107 is substantially rectangular. However, the sealing member 107 is installed so as to pass around the inter-substrate conductive electrode portions 6t and 25t at the regions overlapping with the corners of the counter substrate 20, and thus the corners of the sealing member 107 are substantially arced.

In the liquid crystal device 100 with the above-described configuration, in this embodiment, the pixel electrodes 9a and the common electrode 21 are formed of a light-transmissive conduction film such as an ITO (Indium Tin Oxide) film or an IZO (Indium Zinc Oxide) film, and thus the liquid crystal device 100 is configured as a transmissive liquid crystal device. In the element substrate 10 and the counter substrate 20 of such a transmissive liquid crystal device 100, for example, as indicated by an arrow L, light incident from the side of the counter substrate 20 is modulated while the light passes through the element substrate 10, so that an image can be displayed.

The liquid crystal device 100 according to this embodiment is used as a color display device of an electronic apparatus such as a small-sized camera, a mobile computer, and a cellular phone. Therefore, in the liquid crystal device 100 according to this embodiment, one of the counter substrate 20 and the element substrate 10 also has a function of a color filter substrate in which color filter layers 28 described below are formed. In this embodiment, the color filter layers 28 of respective colors are formed in the regions partitioned by the black matrix portions 29b of the light-shielding protrusions 29 in the counter substrate 20 between the counter substrate 20 and the element substrate 10. In the liquid crystal device 100, a polarization film, a phase difference film, a polarization plate, or the like are disposed in a predetermined direction with respect to the liquid crystal panel 100p in accordance with kinds of liquid crystal layer 50 to be used, a normally white mode, and a normally black mode.

Specific Configuration of Pixels

Figure 3:
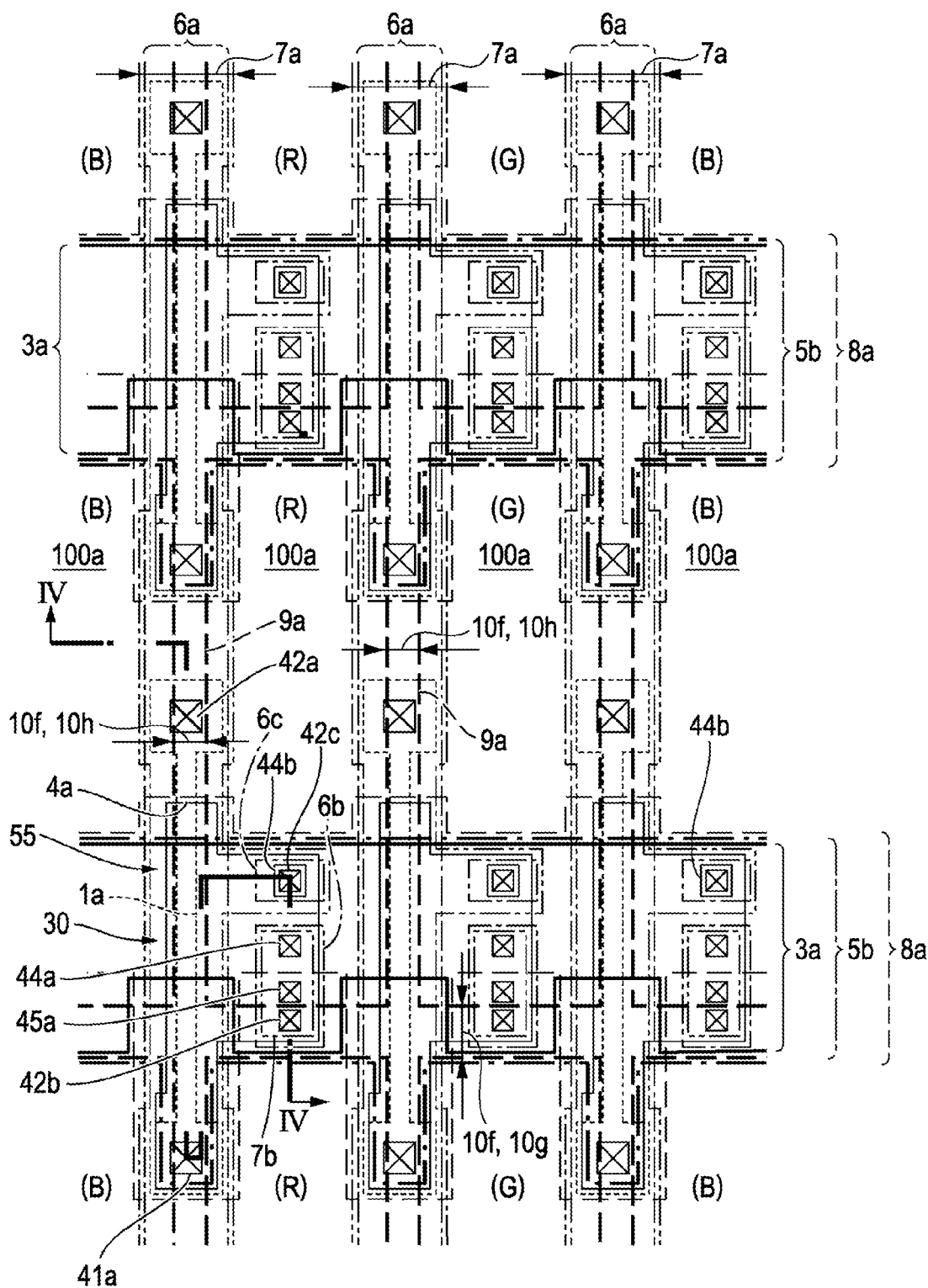
FIG. 3 is a plan view illustrating a plurality of pixels adjacent to each other in an element substrate used in the liquid crystal device according to a first embodiment of the invention.
Figure 4:
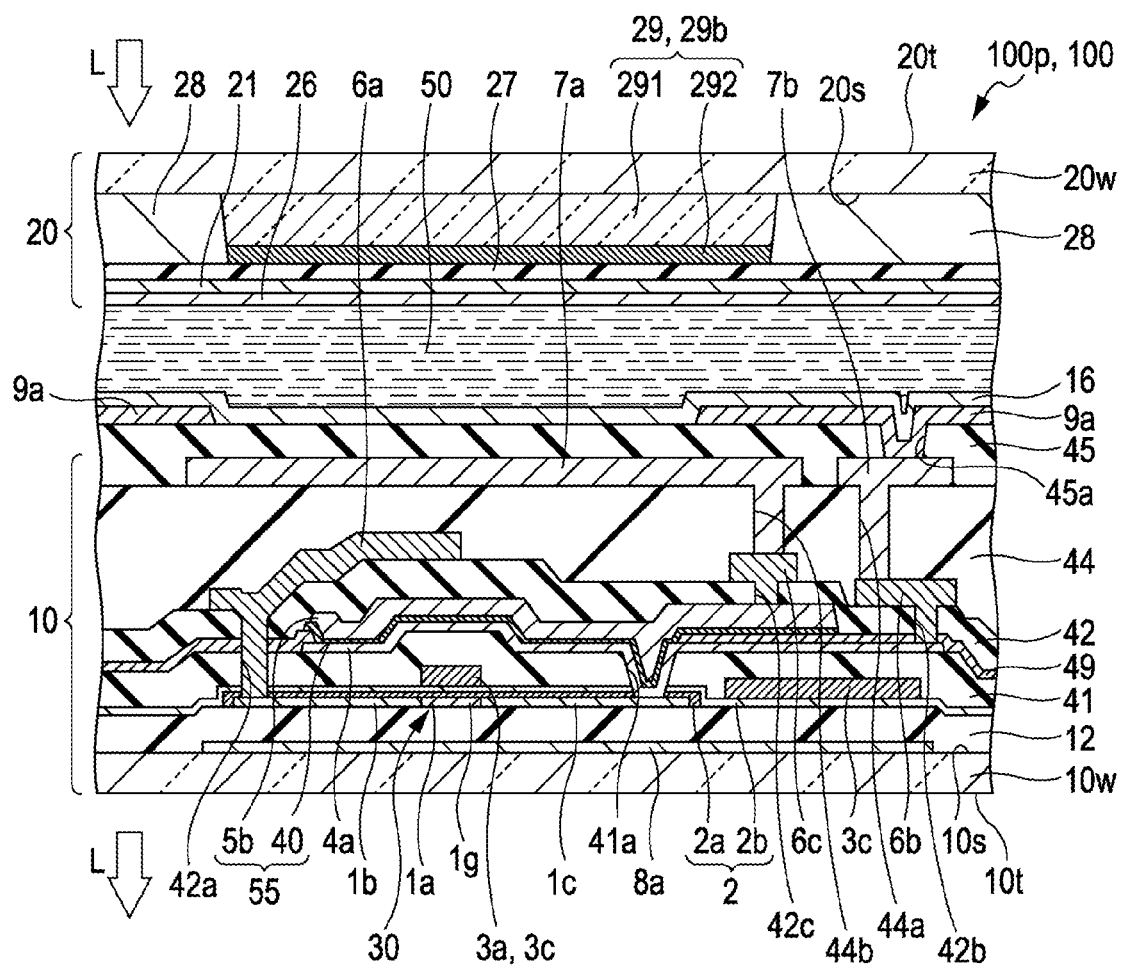
FIG. 4 is a sectional view taken along the line IV-IV of the liquid crystal device according to the first embodiment of the invention.

FIG. 3 is a plan view illustrating a plurality of pixels adjacent to each other in the element substrate 10 used in the liquid crystal device 100 according to the first embodiment of the invention. FIG. 4 is a sectional view taken along the line IV-IV of the liquid crystal device 100 according to the first embodiment of the invention. In FIG. 3, a light-shielding layer 8a is indicated by a thick one-dot chain line, a semiconductor line 1a is indicated by a thin short dotted line, the scanning line 3a is indicated by a thick solid line, a drain electrode 4a is indicated by a thin solid line, the data line 6a and relay electrodes 6b and 6c are indicated by a thin one-dot chain line, the capacitor line 5b is indicated by a thin long dashed line, a constant potential line 7a and a relay electrode 7b are indicated by a thin two-dot chain line, and the pixel electrode 9a is indicated by a thick long dashed line. In the element substrate 10, a dielectric layer 40 and an etching stopper layer 49 are not illustrated.

On the one surface 10s of the element substrate 10 facing the counter substrate 20, as shown in FIGS. 3 and 4, the pixel electrode 9a is formed in each of the plurality of pixels 100a. The data lines 6a and the scanning lines 3a are formed along the inter-pixel regions 10f interposed between the adjacent pixel electrodes 9a. In this embodiment, since the inter-pixel regions 10f extend horizontally and vertically, the scanning lines 3a extend straight along first inter-pixel regions 10g extending in the X direction (first direction) among the inter-pixel regions 10f and the data lines 6a extend straight along second inter-pixel regions 10h extending in the Y direction (second direction). Further, the pixel transistors 30 are formed to correspond to the intersections between the data lines 6a and the scanning lines 3a. In this embodiment, the pixel transistors 30 are formed at the intersections between the data lines 6a and the scanning lines 3a and in the vicinities of the intersections. In the element substrate 10, the capacitor line 5b is formed to overlap the scanning line 3a and the common potential Vcom is applied to the capacitor line 5b. In this embodiment, the capacitor line 5b includes a main line portion extending straight to overlap the scanning line 3a and a sub-line portion extending to overlap the data line 6a at the intersection between the data line 6a and the scanning line 3a.

In the element substrate 10, as shown in FIG. 4, the pixel electrodes 9a formed on the substrate surface (the one surface 10s facing the counter substrate 20) of a substrate body 10w such as a quartz substrate or a glass substrate on the side of the liquid crystal layer 50, the pixel transistors 30 for pixel switching, and the alignment film 16 are formed as main constituent elements. In the counter substrate 20, a light-transmissive substrate body 20w such as a quartz substrate or a glass substrate, the light-shielding protrusion portions 29 formed on a surface (the one surface 20s facing the element substrate 10) on the side of the liquid crystal layer 50, the color filter layers 28, the common electrode 21, and the alignment film 26 are formed as main constituent elements.

In the element substrate 10, a light-shielding layer 8a formed of a conductive film such as a conductive polysilicon film, a metal silicide film, a metal film, or a metal compound film is formed on the one surface 10s of the element substrate of the substrate body 10w. In this embodiment, the light-shielding layer 8a is formed of a light-shielding film such as tungsten silicide (WSi). Therefore, the light-shielding layer 8a prevents an erroneous operation from being caused due to a photocurrent in the pixel transistor 30 when light passing through the liquid crystal device 100 is reflected from another member and the reflected light is incident on the semiconductor layer 1a. Further, since the light-shielding layer 8a extends to overlap the scanning line 3a, the light-shielding layer 8a and the scanning line 3a is electrically connected to each other outside the image display region 10a. Accordingly, the light-shielding layer 8a also functions as a scanning line.

On the one surface 10s of the substrate body 10w, a light-transmissive insulation film 12 is formed in an upper layer of the light-shielding layer 8a and the pixel transistor 30 including the semiconductor layer 1a is formed on the surface of the insulation film 12. In this embodiment, the insulation film 12 is formed of a silicon nitride film or a silicon oxide film (including silicate glass) such as NSG (Non-doped Silicate Glass), PSG (PhosphoSilicate Glass), BSG (Boron Silicate Glass), or BPSG (Boron PhosphoSilicate Glass). The insulation film 12 is formed by the use of a silane gas ($SiH_4$), dichlosilane ($SiCl_2H_2$), TEOS (tetra-ethoxysilane/tetra-ethyl-ortho-silicate/$Si(OC_2H_5)_4$), TEB (tetra-ethyl-borate), TMOP (tetra-methyl-oxy-phosphate), or the like by a CVD method, a decompression CVD method, a plasma CVD method, or the like.

The pixel transistor 30 includes the semiconductor layer 1a oriented in the long side direction of the extension direction of the data line 6a and a gate electrode 3c extending a direction perpendicular to the length direction of the semiconductor layer 1a and overlapping the middle portion of the semiconductor layer 1a in the length direction of the semiconductor layer 1a. In this embodiment, the gate electrode 3c is formed of a part of the scanning line 3a. The pixel transistor 30 further includes a light-transmissive gate insulation layer 2 between the semiconductor layer 1a and the gate electrode 3c. The semiconductor layer 1a includes a channel region 1g facing the gate electrode 3c with the gate insulation layer 2 interposed therebetween and further includes a source region 1b and a drain region 1c on both sides of the channel region 1g. In this embodiment, the pixel transistor 30 has an LDD structure. Therefore, each of the source region 1b and the drain region 1c includes low-concentration regions on both sides of the channel region 1g and a high-concentration region at a location adjacent to the low-concentration region on the opposite side to the channel region 1g.

The semiconductor layer 1a is formed of a polysilicon film (multi-crystalline silicon film) or the like. The gate insulation layer 2 has a two-layer structure that includes a first gate insulation layer 2a formed of a silicon oxide film obtained through thermal oxidation of the semiconductor layer 1a and a second gate insulation layer 2b formed of a silicon oxide film formed by a decompression CVD method under the high-temperature condition of 700° C. to 900° C. The gate electrode 3c and the scanning line 3a are formed of a conductive film such as a conductive polysilicon film, a metal silicide film, a metal film, or a metal compound film.

In this embodiment, the gate electrode 3c has a two-layer structure that includes a conductive polysilicon film and a tungsten silicide film.

A light-transmissive inter-layer insulation film 41 formed of a silicon oxide film such as NSG, PSG, BSG, or BPSG is formed on an upper layer of the gate electrode 3c. The drain electrode 4a is formed in an upper layer of the inter-layer insulation film 41. In this embodiment, the inter-layer insulation film 41 is formed of a silicon oxide film. The drain electrode 4a is formed of a conductive film such as a conductive polysilicon film, a metal silicide film, a metal film, or a metal compound film. In this embodiment, the drain electrode 4a is a titanium nitride film. The drain electrode 4a is formed to partially overlap the drain region 1c (the source and drain regions of a pixel electrode) of the semiconductor layer 1a, and thus is electrically connected to the drain region 1c via a contact hole 41a formed through the inter-layer insulation film 41 and the gate insulation layer 2.

The light-transmissive etching stopper layer 49 and the light-transmissive dielectric layer 40 formed of a silicon oxide film are formed in an upper layer of the drain electrode 4a, and the capacitor lines 5b are formed in an upper layer of the dielectric layer 40. The dielectric layer 40 may be formed of not only a silicon compound such as a silicon oxide film or a silicon nitride film but also a dielectric layer with a high-dielectric constant, such as an aluminum oxide film, a titanium oxide film, a tantalum oxide film, a niobium oxide film, a hafnium oxide film, a lanthanum oxide film, or a zirconium oxide film. The capacitor line 5b is formed of a conductive film such as a conductive polysilicon film, a metal silicide film, a metal film, or a metal compound film. In this embodiment, the capacitor line 5b has a three-layer structure of a titanium nitride film, an aluminum film, and a titanium nitride film. Here, the capacitor line 5b overlaps with the drain electrodes 4a via the dielectric layer 40 to form the storage capacitor 55.

The inter-layer insulation film 42 is formed in an upper layer of the capacitor line 5b, and the data line 6a and the relay electrodes 6b and 6c are formed of the same conductive film in an upper layer of the inter-layer insulation film 42. The inter-layer insulation film 42 is formed of a silicon oxide film. The data line 6a and the relay electrodes 6b and 6c are formed of a conductive film such as a conductive polysilicon film, a metal silicide film, a metal film, or a metal compound film. In this embodiment, the data line 6a and the relay electrodes 6b and 6c are formed of an aluminum alloy film or a two-layer or four-layer lamination film of a titanium nitride film and an aluminum film. The data line 6a is electrically connected to the source region 1b (the source and drain regions on the side of the data line) via a contact hole 42a formed through the inter-layer insulation film 42, the etching stopper layer 49, the inter-layer insulation film 41, and the gate insulation layer 2. The relay electrode 6b is electrically connected to the drain electrode 4a via a contact hole 42b formed through the inter-layer insulation film 42 and the etching stopper layer 49. The relay electrode 6c is electrically connected to the drain electrode 4a via a contact hole 42c formed through the inter-layer insulation film 42.

A light-transmissive inter-layer insulation film 44 formed of a silicon oxide film or the like is formed in the upper layer of the data line 6a and the relay electrodes 6b and 6c, and the constant potential line 7a and the relay electrode 7b are formed in an upper layer of the inter-layer insulation film 44. The inter-layer insulation film 44 is formed of a silicon oxide film formed by, for example, a plasma CVD method of using and a tetraethoxysilane and oxygen gas or a plasma CVD method of using a silane gas and a nitrous oxide gas, and the surface of the inter-layer insulation film 44 is flattened. The constant potential line 7a and the relay electrode 7b are formed of a conductive film such as a conductive polysilicon film, a metal silicide film, a metal film, or a metal compound film. In this embodiment, the constant potential line 7a and the relay electrode 7b are formed of an aluminum alloy film or a two-layer or four-layer lamination film of a titanium nitride film and an aluminum film. The relay electrode 7b is electrically connected to the relay electrode 6b via a contact hole 44a formed through the inter-layer insulation film 44. The constant potential line 7a is electrically connected to the relay electrode 6c via a contact hole 44b formed through the inter-layer insulation film 44, and consequently the constant potential line 7a is electrically connected to the capacitor line 5b via the relay electrode 6c. Here, since the constant potential line 7a extends to overlap the data line 6a, the constant potential line 7a functions as a shield layer and a light-shielding layer and also functions as a capacitor line that supplies the common potential Vcom like the capacitor line 5b.

A light-transmissive inter-layer insulation film 45 formed of a silicon oxide film or the like is formed in an upper layer of the constant potential line 7a and the relay electrode 7b, and the pixel electrode 9a formed of a light-transmissive conductor film such as an ITO (Indium Tin Oxide) film is formed in an upper layer of the inter-layer insulation film 45. The inter-layer insulation film 45 is formed of a silicon oxide film formed by, for example, a plasma CVD method of using a tetraethoxysilane and oxygen gas or a plasma CVD method of using a silane gas and a nitrous oxide gas, and the surface of the inter-layer insulation film 44 is flattened.

The pixel electrode 9a partially overlaps the relay electrode 7b, and thus is electrically connected to the relay electrode 7b via a contact hole 45a formed through the inter-layer insulation film 45. As a result, the pixel electrode 9a is electrically connected to the drain region 1c via the relay electrode 7b, the relay electrode 6b, and the drain electrode 4a.

The alignment film 16 is formed on the surfaces of the pixel electrodes 9a. The alignment film 16 is formed of an oblique evaporated film such as a resin film such as polyimide or a silicon oxide film. In this embodiment, the alignment film 16 is an inorganic alignment film (vertical alignment film) formed of an oblique evaporated film such as $SiO_x$ (where x<2), $SiO_2$, $TiO_2$, MgO, $Al_2O_3$, $In_2O_3$, $Sb_2O_3$, or $Ta_2O_5$. A light-transmissive protective film such as a silicon oxide film or a silicon nitride film is formed between the alignment film 16 and the pixel electrode 9a. A structure may be employed in which a concave portion formed between the pixel electrodes 9a is buried. In such a configuration, the alignment film 16 can be formed on a flat surface.

Configuration of Counter Substrate 20 (Color Filter Substrate)

In the counter substrate 20, the light-shielding protrusion portions 29, a protective film 27 formed of a silicon oxide film or the like, and the common electrode 21 formed of a light-transmissive conductive film such as an ITO film are formed on the surface (the one surface 20s facing the element substrate 10) of the light-transmissive substrate body 20w (light-transmissive substrate), such as a quartz substrate or a glass substrate, on the side of the liquid crystal layer 50 and the alignment film 26 is formed so as to cover the common electrode 21. Further, on the one surface 20s of the substrate body 20w, the color filter layers 28 of respective colors are formed in the regions partitioned by the protrusion portions 29. Like the alignment film 16, the alignment film 26 is formed of an oblique evaporated film such as a resin film such as polyimide or a silicon oxide film. In this embodiment, the alignment film 26 is an inorganic alignment film (vertical alignment film) formed of an oblique evaporated film such as $SiO_x$ (where x<2), $SiO_2$, $TiO_2$, MgO, $Al_2O_3$, $In_2O_3$, $Sb_2O_3$, or $Ta_2O_5$. The alignment films 16 and 26 vertically align nematic liquid crystal compounds with negative dielectric anisotropy used in the liquid crystal layer 50, and thus the liquid crystal panel 100$p$ operates in a normally black VA mode.

In the data line driving circuit 101 and the scanning line driving circuit 104 described with reference to FIG. 1 and FIGS. 2A and 2B, a complementary transistor circuit or the like including an n-channel type driving transistor and a p-channel type driving transistor is formed. Here, the driving transistors are formed in some of the processes of manufacturing the pixel transistors 30. Therefore, the cross-sectional configuration which is substantially the same as the cross-sectional configuration shown in FIG. 4 is also formed in the regions where the data line driving circuit 101 and the scanning line driving circuit 104 are formed in the element substrate 10.

Detailed Configurations of Color Filter Layer 28 and Light-Shielding Protrusion Portion 29

Figure 5A:
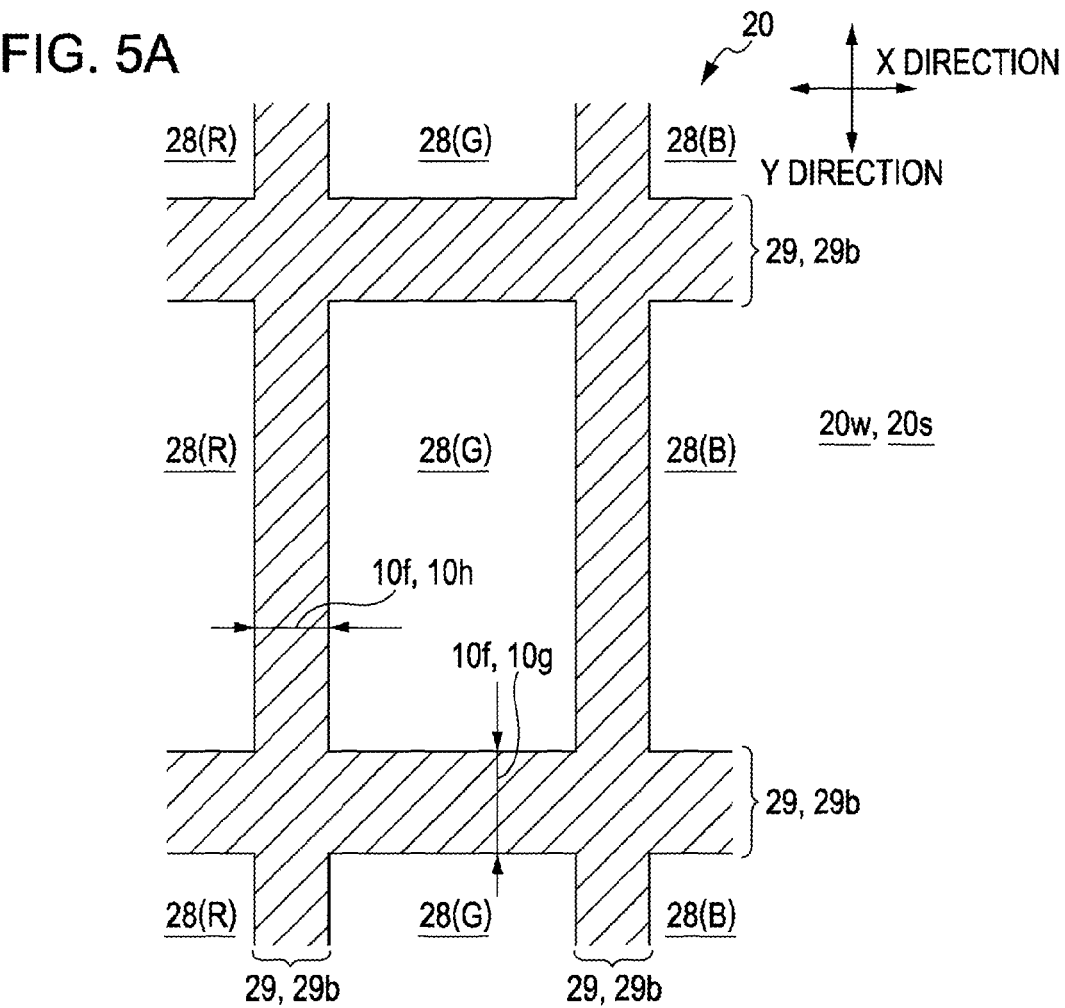
FIGS. 5A and 5B are diagrams schematically illustrating the configuration of a counter substrate (color filter substrate) of the liquid crystal device according to the first embodiment of the invention.
Figure 5B:
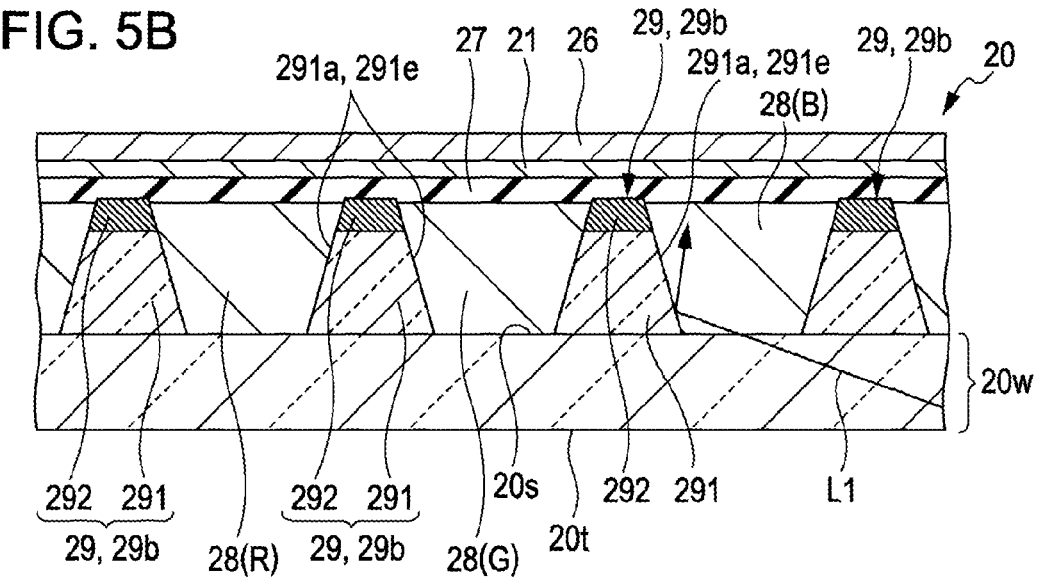

FIGS. 5A and 5B are diagrams schematically illustrating the configuration of the counter substrate 20 (color filter substrate) of the liquid crystal device 100 according to the first embodiment of the invention. FIGS. 5A and 5B are a plan view and a sectional view schematically illustrating the counter substrate 20, respectively.

On the one surface 20$s$ of the substrate body 20$w$ of the counter substrate 20, as shown in FIGS. 5A and 5B, the black matrix portions 29$b$ of the light-shielding protrusion portions 29 are formed in the regions overlapping the inter-pixel pixel regions 10$f$ of the element substrate 10 and the color filter layers 28 of respective colors are formed in the regions partitioned by the protrusion portions 29. In this embodiment, since the color filter layers 28 have substantially the same thickness (height) as the protrusion portions 29, the surfaces of the color filter layers 28 and the surfaces of the protrusion portions 29 form a substantially continuous flat surface. Further, in the counter substrate 20, the light-transmissive protective film 27 formed of an inorganic material or an organic material is formed on the surfaces of the color filter layers 28, and the common electrode 21 and the alignment film 26 are formed in this order on the surface of the protective film 27.

In regard to the color filter layers 28, in this embodiment, a red (R) color filter layer 28(R), a green (G) color filter layer 28(G), and a blue (B) color filter layer 28(B) are repeatedly formed in this order along the X direction. Therefore, in the portions of the protrusion portions 29 extending in the Y direction, the plurality of pixels 100$a$ are partitioned for the respective colors. In this embodiment, a stripe arrangement is employed in which the red (R), green (G), and blue (B) color filter layers 28 are arranged in the Y direction. Therefore, the portions of the protrusion portions 29 extending in the X direction also partition the pixels 100$a$ of the same color.

In the color filter layers 28 of the counter substrate 20 having the above-described configuration, a color material is dispersed in a resin material. When the color filter layers 28 are formed, a method of ejecting and forming a liquid color filter material to predetermined regions by an ink jet technique can be employed. Further, a method may be used in which the liquid color filter material is applied by a spin coat technique and is cured, and then the cured film is removed from predetermined regions by a photolithography technique and an etching technique to form the color filter layers 28. Further, a method may be used in which a photosensitive liquid color filter material is applied by a spin coat technique, is exposed, and is developed to form the color filter layers 28. When any one of these methods is employed, the color filter layers 28 have a refractive index of about 1.49 since a resin material such as an acrylic resin is the main material.

To increase the chromaticity of the color filter layers 28, the color filter layers 28 have to be formed thickly. Therefore, in this embodiment, the protrusion portions 29 are also formed thickly. When the protrusion portions 29 are formed, in this embodiment, the protrusion portions 29 have a two-layer structure of a light-transmissive layer 291 and a metal-based light-shielding layer 292 laminated on the flat surface of the light-transmissive layer 291. Here, the light-transmissive layer 291 is formed of a metal oxide layer formed by a CVD method and a coating method or a light-transmissive photosensitive resin layer formed by a coating method. The metal-based light-shielding layer 292 is formed of metal, a metal compound, or the like.

More specifically, in this embodiment, the light-shielding layer 292 is formed of a lamination film of a tungsten silicide film and an aluminum alloy film or a lamination film of an aluminum layer, an aluminum layer, and a titanium nitride film.

The light-transmissive layer 291 is a titanium oxide film ($TiO_2$ with a refractive index of 2.5), a zirconium oxide film (ZrO with a refractive index of 2.4), an aluminum oxide film ($Al_2O_3$ with a refractive index of 1.7), or a silicon nitride film (SiN with a refractive index of 1.8). The refractive index of the light-transmissive layer 291 is different from the refractive index of the color filter layer 28. Therefore, side surfaces 291$a$ of the light-transmissive layer 291 form reflection surfaces 291$e$ by a refractive index difference between the light-transmissive layer 291 and the refractive index of the color filter layer 28. In this embodiment, the side surface 291$a$ is formed as an inclined surface (an inclined surface oriented toward a side opposite to the side of the substrate body 10$w$), and the reflection surface 291$e$ is formed as an obliquely upward inclined surface.

To form the protrusion portions 29 with the above-described configuration, for example, a light-transmissive film forming the light-transmissive layer 291 is formed by a CVD method, the light-shielding film forming the light-shielding layer 292 is formed by a sputter method or the like, and then the light-shielding film and the light-transmissive film are patterned together by a photolithography technique and an etching technique to form the light-shielding protrusion portion 29 in which the light-shielding layer 292 is laminated in the upper layer of the light-transmissive layer 291. Further, the light-transmissive layer 291 may be patterned, and then the light-shielding layer 292 may be patterned to form the light-shielding protrusion portion 29 in which the light-shielding layer 292 is laminated in the upper layer of the light-transmissive layer 291. In this way, the protrusion portions 29 are formed, and then the color filter layers 28 of the respective colors are sequentially formed in the regions partitioned by the protrusion portions 29.

Main Advantages of Embodiment

As described above, in the counter substrate 20 (the color filter substrate) used in the liquid crystal device 100 according to this embodiment, the light-shielding protrusion portions 29 partitioning the plurality of pixels 100$a$ for the respective colors are formed on the one surface 20s of the light-transmissive substrate body 20w. The color filter layers 28 are formed in the regions partitioned by the light-shielding protrusion portions 29. Here, the light-shielding protrusion portion 29 has the lamination structure of the light-transmissive layer 291 and the metal-based light-shielding layer 292. Therefore, even when the protrusion portion 29 is formed thickly to form the thick color filter layer 28, the metal-based light-shielding layer 292 formed by a film forming method such as a sputter method, by which a film formation speed is slow, can be made to be thin. On the other hand, since a metal oxide layer formed by a CVD method can be used for the light-transmissive layer 291, the film formation speed is faster in the CVD method than in the sputter method or the like. Accordingly, even the thick light-shielding protrusion portion 29 can be efficiently formed.

When the light-transmissive layer 291 is formed, the metal oxide layer formed by a CVD method can be formed with high accuracy by a lithography technique, unlike the black photosensitive resin layer, thereby corresponding to the miniaturization of the pixel 100a.

Further, the side surface 291a of the light-transmissive layer 291 forms the reflection surface 291e, as indicated by an arrow L1 in FIG. 5B. Therefore, even when light is incident from the inclination direction, the light is reflected from the reflection surface 291e. Accordingly, even when the light is incident from the inclination direction, the light rarely travels toward the neighboring pixel 100a. Therefore, even when the protrusion portion 29 has the lamination structure of the light-transmissive layer 291 and the metal-based light-shielding layer 292, the mixed color is rarely generated. Accordingly, even when the pixel 100a is miniaturized, the mixed color is not generated and the color filter layer 28 and the protrusion portion 29 can be formed thickly.

Since the reflection surface 291e is formed as the obliquely upward inclined surface (the inclined surface oriented toward the side opposite to the side of the substrate body 10w), the light reaching the reflection surface 291e in the inclination direction is light traveling in the normal direction of the substrate body 10w. Therefore, high accuracy of display can be improved.

In this embodiment, the side surface 291a of the light-transmissive layer 291 forms the reflection surface 291e by the refractive index difference between the light-transmissive layer 291 and the color filter layer 28. Therefore, the light-transmissive layer 291 having the side surface 291a that forms the reflection surface 291e can be formed merely by optimizing the combination of the materials of the light-transmissive layer 291 and the color filter layer 28.

Here, when light is incident from a medium with a refractive index of $n_0$ to a medium with a refractive index of $n_1$, a reflection ratio is expressed as follows:

$$(n_1-n_0)^2/(n_1+n_0)^2.$$

Therefore, from the viewpoint of an improvement in the reflection ratio of the reflection surface 291e, the refractive index difference between the light-transmissive layer 291 and the color filter layer 28 is preferably large, that the refractive index difference is preferably 0.3 or more and is more preferably 0.5 or more. In order to realize the above-described configuration, for example, the light-transmissive layer 291 may be formed of a material with a high refractive ratio, such as a titanium oxide film (with a refractive ratio of 2.5) and a zirconium oxide film (with a refractive ratio of 2.4).

In this embodiment, the metal oxide film formed by a CVD method or the like has been exemplified as the material of the light-transmissive layer 291. However, a resin material with a refractive index increased by diffusing a material with a high refractive index, such as titanium oxide or zirconium oxide, may be used. The light-transmissive layer 291 can be formed of this resin material in accordance with a coating method.

Second Embodiment

Figure 6A:
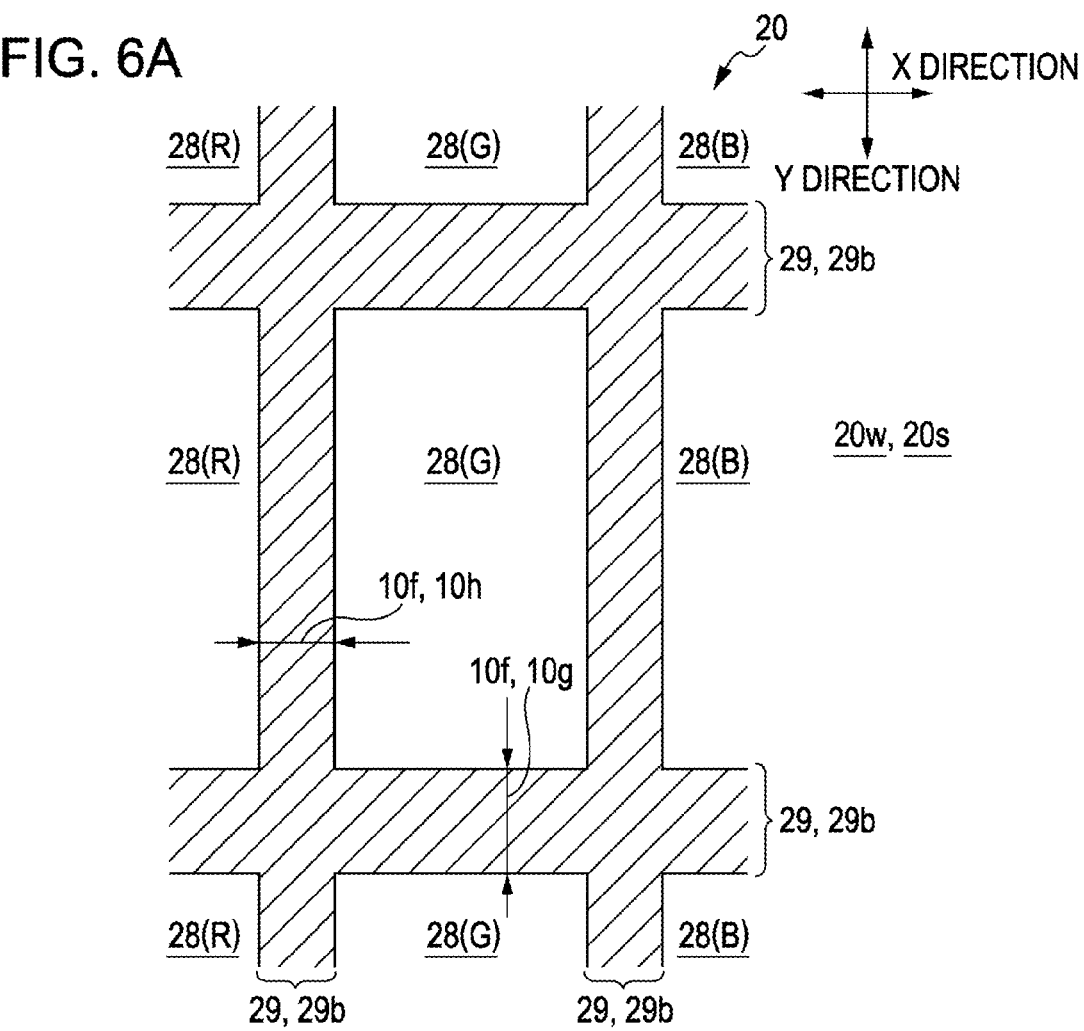
FIGS. 6A and 6B are diagrams schematically illustrating the configuration of a counter substrate (color filter substrate) of a liquid crystal device according to a second embodiment of the invention.
Figure 6B:
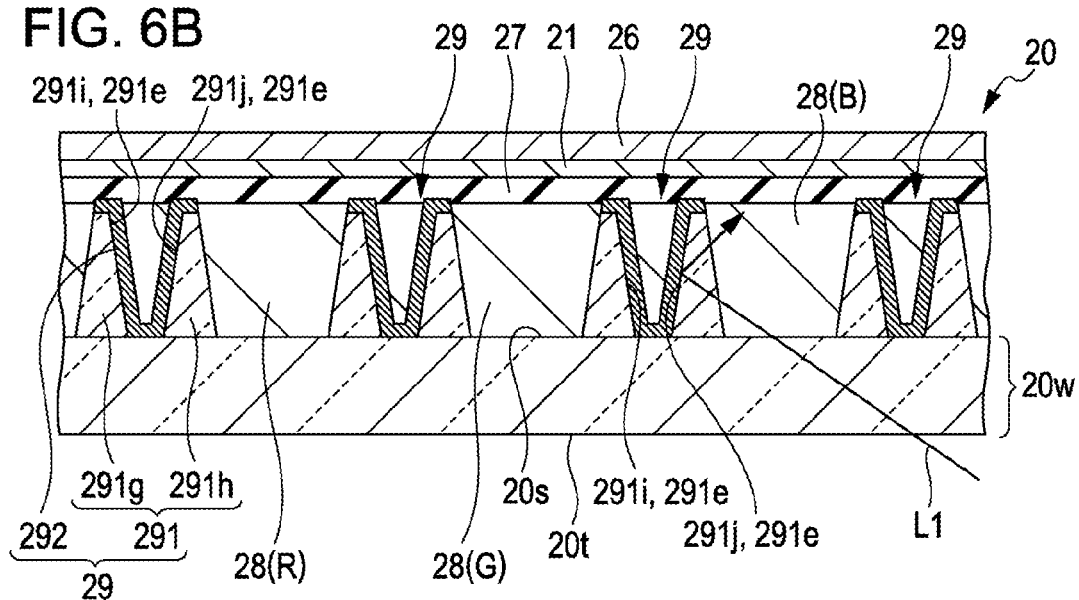

FIGS. 6A and 6B are diagrams schematically illustrating the configuration of the counter substrate 20 (color filter substrate) of the liquid crystal device 100 according to a second embodiment of the invention. FIGS. 6A and 6B are a plan view and a sectional view schematically illustrating the counter substrate 20, respectively. Since the basic configuration of this embodiment is the same as the configuration of the first embodiment, the same reference numerals are given to common portions and the description thereof will not be repeated.

In this embodiment, as shown in FIGS. 6A and 6B, on one surface 20s of a substrate body 20w of a counter substrate 20, black matrix portions 29b of light-shielding protrusion portions 29 are formed in the regions overlapping inter-pixel regions 10f of an element substrate 10 and color filter layers 28 of respective colors are formed in the regions partitioned by the protrusion portions 29, as in the first embodiment. In this embodiment, since the color filter layers 28 have substantially the same thickness (height) as the protrusion portions 29, the surfaces of the color filter layers 28 and the surfaces of the protrusion portions 29 form a substantially continuous flat surface. Further, in the counter substrate 20, the light-transmissive protective film 27 formed of an inorganic material or an organic material is formed on the surfaces of the color filter layers 28, and the common electrode 21 and the alignment film 26 are formed in this order on the surface of the protective film 27.

In this embodiment, to increase the chromaticity of the color filter layers 28, the color filter layers 28 have to be also formed thickly. Therefore, the protrusion portions 29 are also formed thickly. When the protrusion portion 29 is formed, in this embodiment, the light-shielding protrusion portion 29 is formed by a light-transmissive layer 291 formed by a CVD method or a coating method and a metal-based light-shielding layer 292 formed of metal or a metal compound and laminated on an upper layer of the light-transmissive layer 291.

In this embodiment, the light-shielding layer 292 is formed of a lamination film of a tungsten silicide film and an aluminum alloy film or a lamination film of an aluminum layer, an aluminum layer, and a titanium nitride film. The light-transmissive layer 291 is formed of a light-transmissive resin layer formed by exposing and developing a light-transmissive photosensitive resin applied on the substrate body 20w.

Here, the light-transmissive layer 291 may include a first strip-shaped light-transmissive layer 291g and a second strip-shaped light-transmissive layer 291h parallel to the first strip-shaped light-transmissive layer 291g. A side surface 291i (inner side surface) oriented toward the second strip-shaped light-transmissive layer 291h between both side surfaces of the first strip-shaped light-transmissive layer 291g forms a reflection surface 291e by laminating the light-shielding layer 292. A side surface 291j oriented toward the first strip-shaped light-transmissive layer 291g between both side surfaces of the second strip-shaped light-transmissive layer 291h forms a reflection surface 291e by laminating the light-shielding layer 292. Since both side surfaces 291i and 291j are formed as upward inclination surface, the reflection surfaces 291e are formed as inclined surfaces of which an inclination is oriented downward.

To form the protrusion portion 29 with the above-described configuration, a light-transmissive photosensitive resin applied on the substrate body 20w is first exposed and developed to form the light-transmissive layer 291 (the first strip-shaped light-transmissive layer 291g and the second strip-shaped light-transmissive layer 291h). Next, a light-shielding film forming the light-shielding layer 292 is formed by a sputter method or the like, and then the light-shielding film is patterned by a lithography technique and an etching technique to form the protrusion portion 29 in which the light-shielding layer 292 is laminated in an upper layer of the light-transmissive layer 291. After the protrusion portions 29 are formed in this way, the color filter layers 28 of respective colors are sequentially formed in the regions partitioned by the protrusion portions 29. At this time, when a space between the first strip-shaped light-transmissive layer 291g and the second strip-shaped light-transmissive layer 291h is filled with the color filter layer 28, it is possible to prevent an unnecessary unevenness from occurring.

As described above, in the counter substrate 20 (the color filter substrate) used in the liquid crystal device 100 according to this embodiment, the light-shielding protrusion portions 29 partitioning the plurality of pixels 100a for the respective colors are formed on the one surface 20s of the light-transmissive substrate body 20w, as in the first embodiment. The color filter layers 28 are formed in the regions partitioned by the light-shielding protrusion portions 29. Here, the protrusion portion 29 has the lamination structure of the light-transmissive layer 291 and the metal-based light-shielding layer 292. Therefore, even when the protrusion portion 29 is formed thickly to form the thick color filter layer 28, the metal-based light-shielding layer 292 formed by a film forming method such as a sputter method, by which a film formation speed is slow, can be made to be thin. On the other hand, since a light-transmissive resin layer formed by a coating method can be used for the light-transmissive layer 291, the film formation speed is faster in the coating method than in the sputter method or the like. Accordingly, even the thick protrusion portion 29 can be efficiently formed.

When the light-transmissive layer 291 is formed, a light-transmissive resin layer is used. Therefore, the light-transmissive resin layer can be formed with high accuracy by a lithography technique, unlike the black photosensitive resin layer, thereby corresponding to the miniaturization of the pixel 100a.

Further, the side surfaces 291i and 291j of the light-transmissive layer 291 form the reflection surfaces 291e, as indicated by an arrow L1 in FIG. 6B. Therefore, even when light is incident from the inclination direction, the light is reflected from the reflection surfaces 291e. Accordingly, even when the light is incident from the inclination direction, the light rarely travels toward the neighboring pixel 100a. Therefore, even when the protrusion portion 29 has the lamination structure of the light-transmissive layer 291 and the metal-based light-shielding layer 292, the mixed color is rarely generated. Accordingly, even when the pixel 100a is miniaturized, the mixed color is not generated and the color filter layer 28 can be formed thickly.

Other Embodiments

In the above-described embodiments, the case has been described in which the color filter layers 28 are formed in the counter substrate 20 of the liquid crystal device 100. However, the color filter layers 28 may be formed in the element substrate 10.

In the above-described embodiments, the invention is applicable to the case where the color filter layers 28 are formed in a substrate for the liquid crystal device. However, the invention may be applied to a case where the color filter layers 28 are formed in a substrate for another electro-optic device such as an organic electroluminescence device.

Mounting Example on Electronic Apparatus

Figure 7A:
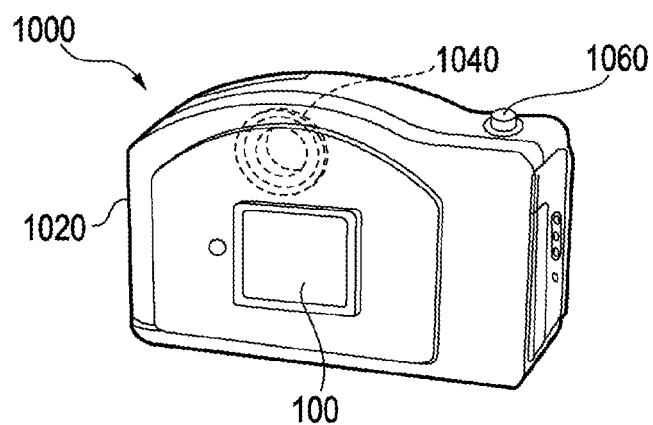
FIGS. 7A to 7C are diagrams illustrating electronic apparatuses including the liquid crystal device of the invention.
Figure 7B:
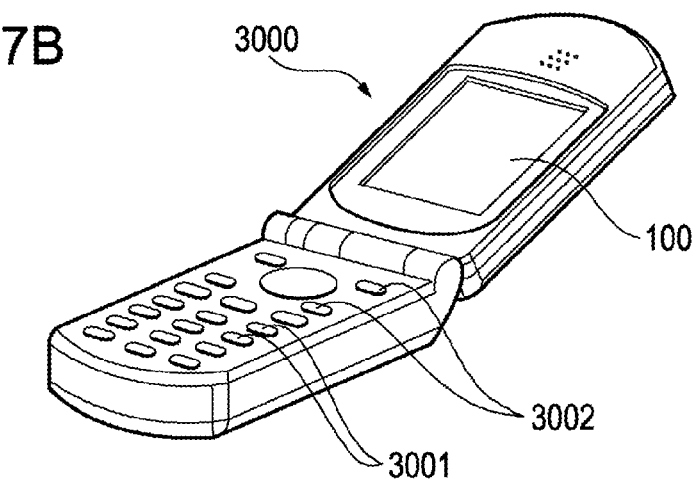
Figure 7C:
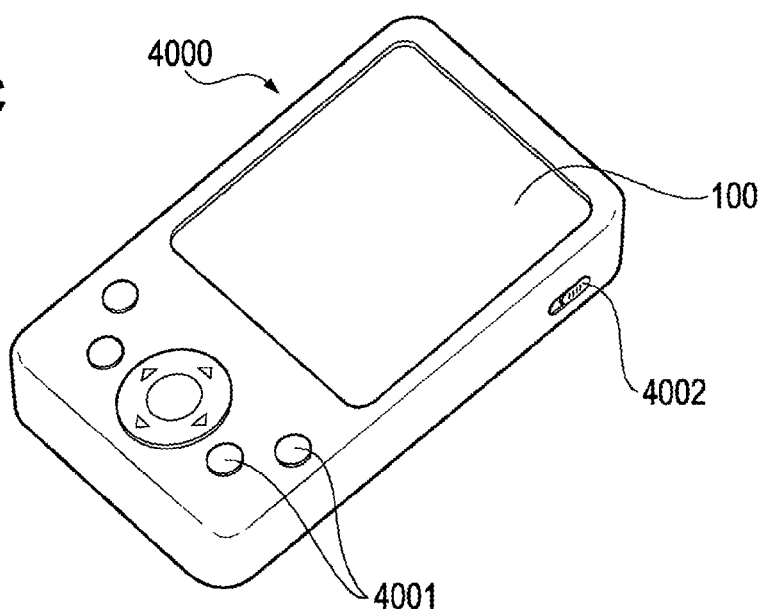
Figure 8A:
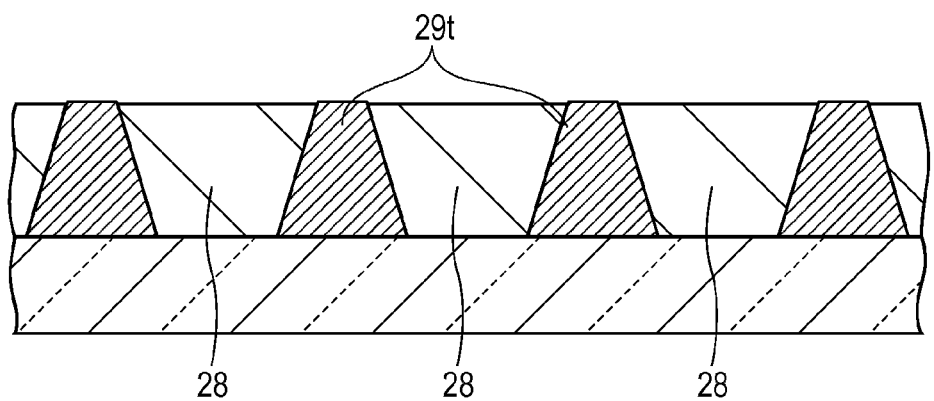
FIGS. 8A and 8B are diagrams illustrating high-shielding protrusion portions according to a reference example.
Figure 8B:
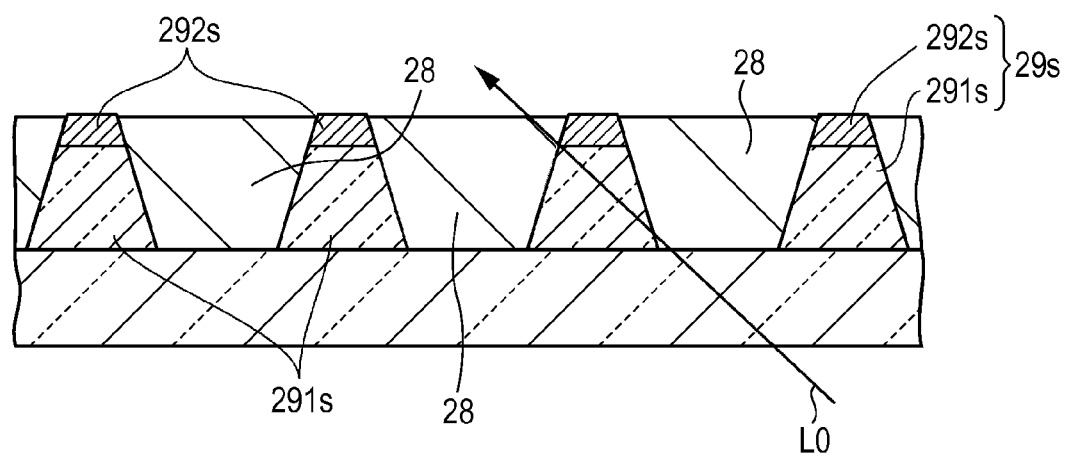

FIGS. 7A to 7C are diagrams illustrating electronic apparatuses that use the liquid crystal device 100 according to the invention. In a digital camera 1000 shown in FIG. 7A, a monitor including the liquid crystal device 100 according to the invention is installed in the middle of the rear surface of a case 1020 having a substantially rectangular parallelepiped shape. A shutter button 1060 and the like are installed on the upper surface of the case 1020. A light-receiving unit 1040 including an optical lens or a CCD (Charge Coupled Device) is installed toward the surface of the case 1020. A cellular phone 3000 shown in FIG. 7B includes a plurality of operation buttons 3001, scroll buttons 3002, and the liquid crystal device 100 serving as a display unit. An information portable terminal 4000 shown in FIG. 7C includes a plurality of operation buttons 4001, a power switch 4002, and the liquid crystal device 100 serving as a display unit. Examples of an electronic apparatus that uses the liquid crystal device 100 include not only the electronic apparatuses shown in FIGS. 7A to 7C but also a liquid crystal television, a car navigation apparatus, a pager, an electronic pocketbook, a calculator, a word processor, a work station, a television telephone, and a POS terminal. The liquid crystal device 100 is used as a display unit of the various kinds of electronic apparatuses.

The entire disclosure of Japanese Patent Application No. 2011-091800, filed Apr. 18, 2011 is expressly incorporated by reference herein.

What is claimed is:

1. A color filter substrate comprising:
a light-transmissive substrate including an incident surface and an outgoing surface with respect to transmitted light;
a plurality of pixels in which a color filter layer is formed;
a protrusion portion that is disposed between the plurality of pixels on the outgoing surface of the light-transmissive substrate and partitions the color filter layer, the protrusion portion including:
a light-transmissive layer comprising a light transmissive material that forms a reflective side surface, the reflective side surface being formed as an inclined surface and partitioning the color filter layer into at least a first color filter having a first color and a second color filter having a second color filter, the first color filter being directly adjacent to the second color filter; and
a light-shielding layer disposed such that the light-transmissive layer is disposed between the light-transmissive substrate and the light-shielding layer,
wherein
the light-transmissive layer is disposed between at least the first color filter and the second color filter,
the light-transmissive layer disposed between the first color filter and the second color filter includes both a first strip-shaped light-transmissive layer and a second strip-shaped light-transmissive layer parallel to the first strip-shaped light-transmissive layer, the first strip-shaped light-transmissive layer has a first side surface facing the first color filter and a second side surface facing the second strip-shaped light-transmissive layer, and the second strip-shaped light-transmissive layer has a first side surface facing the second color filter and a second side surface facing the first strip-shaped light-transmissive layer.

2. The color filter substrate according to claim 1, wherein a side surface of the light-transmissive layer forms the reflective side surface by laminating the light-shielding layer on the side surface.

3. The color filter substrate according to claim 2, wherein the reflective side surface is formed by laminating the light-shielding layer on the second side surface of the first strip-shaped light-transmissive layer oriented toward the second strip-shaped light-transmissive layer, and wherein the reflective side surface is formed by laminating the light-shielding layer on the second side surface of the second strip-shaped light-transmissive layer oriented toward the first strip-shaped light-transmissive layer.

4. An electro-optic device comprising:

a counter substrate including the color filter substrate according to claim 1;

an element substrate in which a pixel transistor and a pixel electrode are formed; and a liquid crystal layer interposed between the counter substrate and the element substrate.

5. An electronic apparatus comprising:

the electro-optic device according to claim 4.

* * * * *